US006192102B1

(12) United States Patent
Ono et al.

(10) Patent No.: US 6,192,102 B1

(45) Date of Patent: Feb. 20, 2001

(54) METHOD FOR FORMING RADIOGRAPHIC IMAGE

(75) Inventors: Koji Ono; Kouji Amitani, both of Hino (JP)

(73) Assignee: Konica Corporation, Tokyo (JP)

( * ) Notice: Under 35 U.S.C. 154(b), the term of this patent shall be extended for 0 days.

(21) Appl. No.: 09/259,610

(22) Filed: Mar. 1, 1999

(30) Foreign Application Priority Data

Mar. 5, 1998 (JP) ........................................ 10-052992

(51) Int. Cl.[7] ........................................ G01N 23/04

(52) U.S. Cl. ........................................ 378/62

(58) Field of Search ........................................ 378/62

(56) References Cited

U.S. PATENT DOCUMENTS 5,290,655 3/1994 Iwasaki .

FOREIGN PATENT DOCUMENTS 0 212 968 A2 3/1987 (EP) .

0 933 673 A1 8/1999 (EP) .

*Primary Examiner*—Craig E. Church

(74) *Attorney, Agent, or Firm*—Frishauf, Holtz, Goodman, Langer & Chick, P.C.

(57) ABSTRACT

A method for forming radiographic image is disclosed. The method comprises the steps of (1) capturing a radiographic image by a flat-panel detector, (2) reading out the radiographic image from the flat-panel detector as image signal, (3) modulating intensity of a laser light beam by the image signals, (4) exposing a silver halide photographic light-sensitive material to the modulated laser light beam by scanning, and (5) processing the silver halide photographic light-sensitive material having a silver halide emulsion layer by a roller transportation automatic processor, in which a photographic characteristic curve of said silver halide photographic light-sensitive material processed by said processor has a gamma value of a straight line connecting a density point of fog+0.5 and a density point of fog+2.5 of from 2.7 to 3.5 and a gamma value of a straight line connecting a density point of fog+0.05 and a density point of fog+0.5 of from 0.8 to 1.3.

9 Claims, 4 Drawing Sheets

METHOD FOR FORMING RADIOGRAPHIC IMAGE

FIELD OF THE INVENTION

This invention relates to a method and a system for forming a radiographic image such as a mammographic image or radiographic image of bones of the limbs.

BACKGROUND OF THE INVENTION

A system has been ordinary used as a system for forming a radiograph for medical diagnosis, in which a silver halide photographic light-sensitive material is contacted with an intensifying screen, and imagewise exposed to X-ray, and developed, fixed and washed by an automatic processor. It has been known in such the system that a sharpness of image is considerably lowered by diffusion of light at the time of exposing the light-sensitive material to light-image converted from X-ray image by the intensifying screen.

On the other hand, recently a system becomes to be used, in which a stimulus phosphor plate is imagewise exposed to X-ray and the stimulus phosphor plate is scanned by a laser light beam to readout the image information accumulated in the stimulus phosphor, as a light signal, the light signal is converted to an electric signal and reconverted to a light signal, and the light signal is recorded on a silver halide photographic light-sensitive material by scanning, and the light-sensitive material is developed, fixed, washed and dried by an automatic processor.

Such the system has an advantage such as that an image processing such as gradation controlling, edge stressing and masking can be applied since the image signal is once converted to the electric signal capable of being electrically processed, compared to the phosphor intensifying screen/film system. However, the sharpness of the image is insufficient for a mammographic image or radiographic image of bones of limbs.

It is theoretically expected that a high sharpness can be obtained by the method by directly reading out the image signal from the flat panel detector difficultly reproduced by an usual laser recording system. A system using a laser thermal diffusion transfer process has been also known as the laser recording system other than that using a silver halide photographic light-sensitive material. In the thermal transfer method, an image receiving sheet and a thermally fusible colorant sheet are superposed and an image is thermally transferred. Such the method has problems such as that the sharpness is insufficient, the apparatus is expensive and the image formation speed is low.

SUMMARY OF THE INVENTION

This invention is made based on the above-mentioned background, and the object of the invention is to provide a method by which a radiographic image can be formed rapidly and stably by means of a low cost apparatus.

The object of the invention can be attained by a method for forming radiographic image comprising the steps of capturing a radiographic image by a flat-panel detector, reading out the radiographic image from the flat-panel detector as an image signal, modulating intensity of a laser light beam by the image signal, exposing a silver halide photographic light-sensitive material to the modulated laser light beam by scanning, and processing the silver halide photographic light-sensitive material having a silver halide emulsion layer by a roller transportation automatic processor, in which a photographic characteristic curve of the silver halide photographic light-sensitive material processed by the processor has a gamma value of a straight line connecting a density point of fog+0.5 and a density point of fog+2.5 of from 2.7 to 3.5 and a gamma value of a straight line connecting a density point of fog+0.05 and a density point of fog+0.5 of from 0.8 to 1.3.

DETAILED DESCRIPTION OF THE INVENTION

Figure 1:
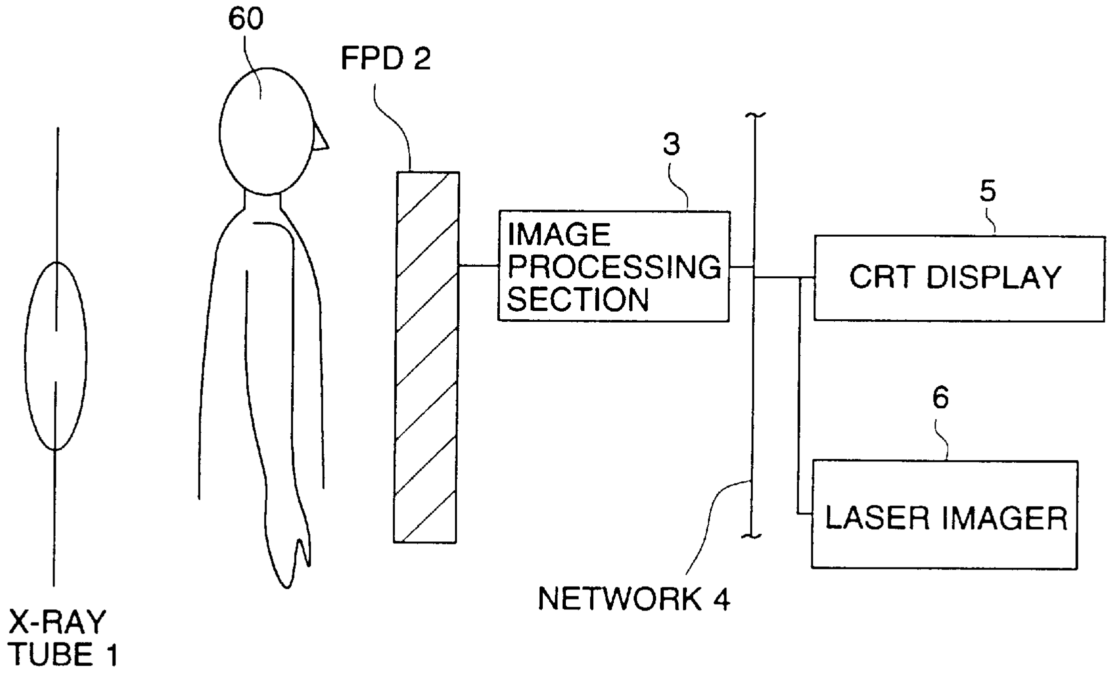
FIG. 1 is a schematic structural drawing of a radiographic image forming system.

The embodiment of the radiographic image forming method of the invention is described below according to the drawing. However, the invention is not limited to this embodiment.

In the radiographic image forming system, as shown in FIG. 1, an object 60 is irradiated by X-ray generated from a X-ray generating bulb 1 so that the radiographic image is captured by a flat panel detector (FPD) 2. The radiographic image is readout from the flat panel detector as an image signal. The image signal is processed in an image processing section 3 and send to a network 4. A CRT display 5 and a laser imager 6 are connected to the network 4, and the image can be displayed on the CRT display 5 and printed out by the laser imager 6.

As the radiographic image forming means, a flat panel detector (FPD) is disclosed in JP O.P.I. No. 6-342098. X-ray passed through an object is absorbed by a layer of a photoconductive substance such as α-Se to generate electric charge corresponding to the intensity of X-ray, and the charge is detected at each pixel. Another example of FPD is disclosed in JP O.P.I. No. 9-90048, in which X-ray is absorbed by a fluoresent layer such as an intensifying screen to emmit fluorescent light, and the intensity of the fluorescent light is detected by a photodiode provided at each pixel. Other than the above-mentioned, a method using a CCD or a C-MOS sensor for detecting the fluorescent light is known.

In the method using the type of FPD described in JP O.P.I. No. 6-342098, degradation of the sharpness of image in the FDP is small and a sharp image can be obtained since the intensity of X-ray is directly converted to electric charge at each of pixel. Accordingly such the FPD is suitable for enhancing the effects of the radiographic imagerecording system and the radiographic image recording method of the invention. The flat panel detector is constituted as shown in FIGS. 2 and 3.

An example of flat panel detector usable in the invention is described in JP O.P.I. No. 6-342098, in which X-ray passing through an object is absorbed by a photoconductive layer such as a layer of α-Se so as to generate an electric charge corresponding to the intensity of X-ray, and the charge is detected per each pixel. Example of another flat panel detector is described in JP O.P.I. No. 9-90048, in which X-ray is absorbed in a fluorescent layer such as an intensifying screen so as to generate fluorescent light and the intensity of fluorescent light is detected by a light detector such as a photo-diode provided at each pixel. A CCD or a C-MOS sensor are usable as a fluorescent light detector.

The flat panel detector described in the foregoing JP O.P.I. No. 6-342098 is preferable for enhancing the effects of the invention. In such the detector, degradation of sharpness is a little and an image excellent in the sharpness can be obtained since the amount of X-ray is directly converted to the charge amount at each pixel.

Figure 2:
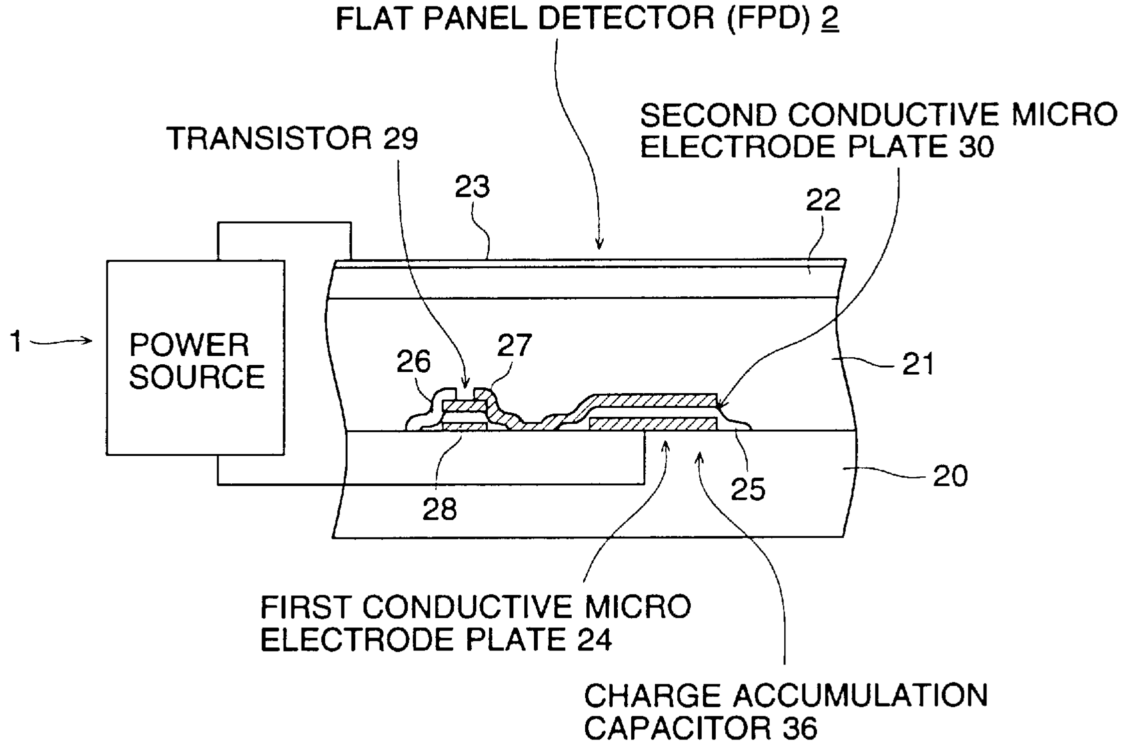
FIG. 2 is a schematic drawing of cross section of a flat panel detector (FPD).
Figure 3:
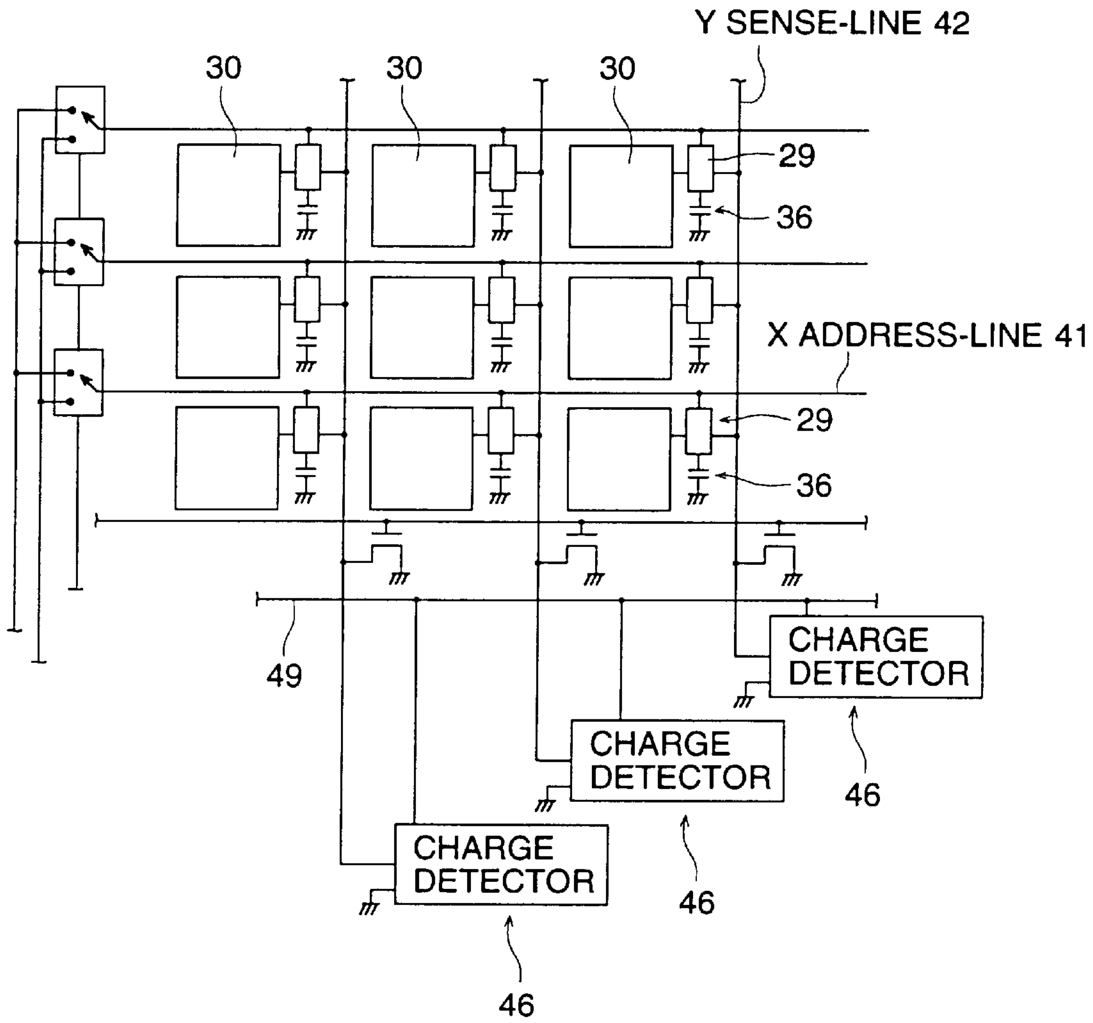
FIG. 3 is a schematic drawing of plan view of a flat panel detector (FPD).

As shown in FIG. 2, the flat panel detector is constituted by laminating a photoconductive layer 21, a dielectric layer 22 and a front electric conductive layer 23 in this order on a dielectric substrate 20. A plurality of first micro electric conductive electrode plat 24 is provided on the dielectric substrate 20. The outline of the minimum pixel which can be resolved by the flat panel detector (FPD) 2 is determined by the size of the micro electrode plate 24. A static charge capacitor dielectric material 25 was provided on the first micro electrode plate 24. A radiographic image can be formed when the dielectric layer 22 is omitted and the invention can be realized. In such the case, the maintenance of electric charged accumulated in the charge accumulating capacitor 36 and the sharpness of the radiographic image are probably lowered a little.

A plurality of transistor each having two electrodes 26 and 27 and a gate is laminated on the dielectric substrate. Moreover, a plurality of second electric conductive electrode microplate 30 is laminated.

As shown in FIG. 3, at least one transistor 29 connects plural electric conductive electrode micro plate with a X address-line 41 and a Y sense-line 42. The electric charge accumulating capacitor 36 is constituted by the first electric conductive micro electrode plate 24, the second electric conductive micro electrode plate 30 and the static charge capacitor dielectric material 25. The second electric conductive micro electrode plate 30 is also connected to the electrode 27 of the transistor 29. The first electric conductive electrode micro plate 24 is grounded.

The transistor 29 functions as a two way switch and provide electric current between the Y sense 42 and the electric charge accumulating capacitor 36 responding to applying a bias voltage to the gate through the X address-line 41.

An electric conductive electrode or the X address-line 41 and an electric conductive electrode or the Y sense-line are provided in the space between the second plural electric conductive micro electrode plates 30. The X address-line 41 and Y sense-line 42 are positioned so that they are crossed each other at a right angle. The X address-line 41 and the Y sense-line 42 can be respectively accessed through a lead wire or a connector along the side or edge of the flat panel detector (FPD).

Each of the X address-lines 41 is sequentially addressed by applying a bias voltage to the line or to the gate of transistor 29 connected to the X address-line. As a result of that, the transistor 29 is made to an electric conductive state and the electric charge accumulated in the charge accumulating capacitor 39 is flowed in the Y sense-line and the input of a charge detector 46. The charge detector generate output voltage in proportion to the charge detected on the Y sense-line. The outputs of the charge detectors 46 are sequentially sampled so as to form an image signal showing the charge distribution of micro capacitors on the addressed X address-lines. Each of the micro capacitors corresponds to one pixel. The charge amplifier is reset through a reset line 49 when a signal is read out from a line having a pixel on the X address-line which. Then the next address line 41 is addressed. Such the process is repeated until all the charge accumulating capacitors 36 are sampled and then the image is wholly readout.

Figure 4:
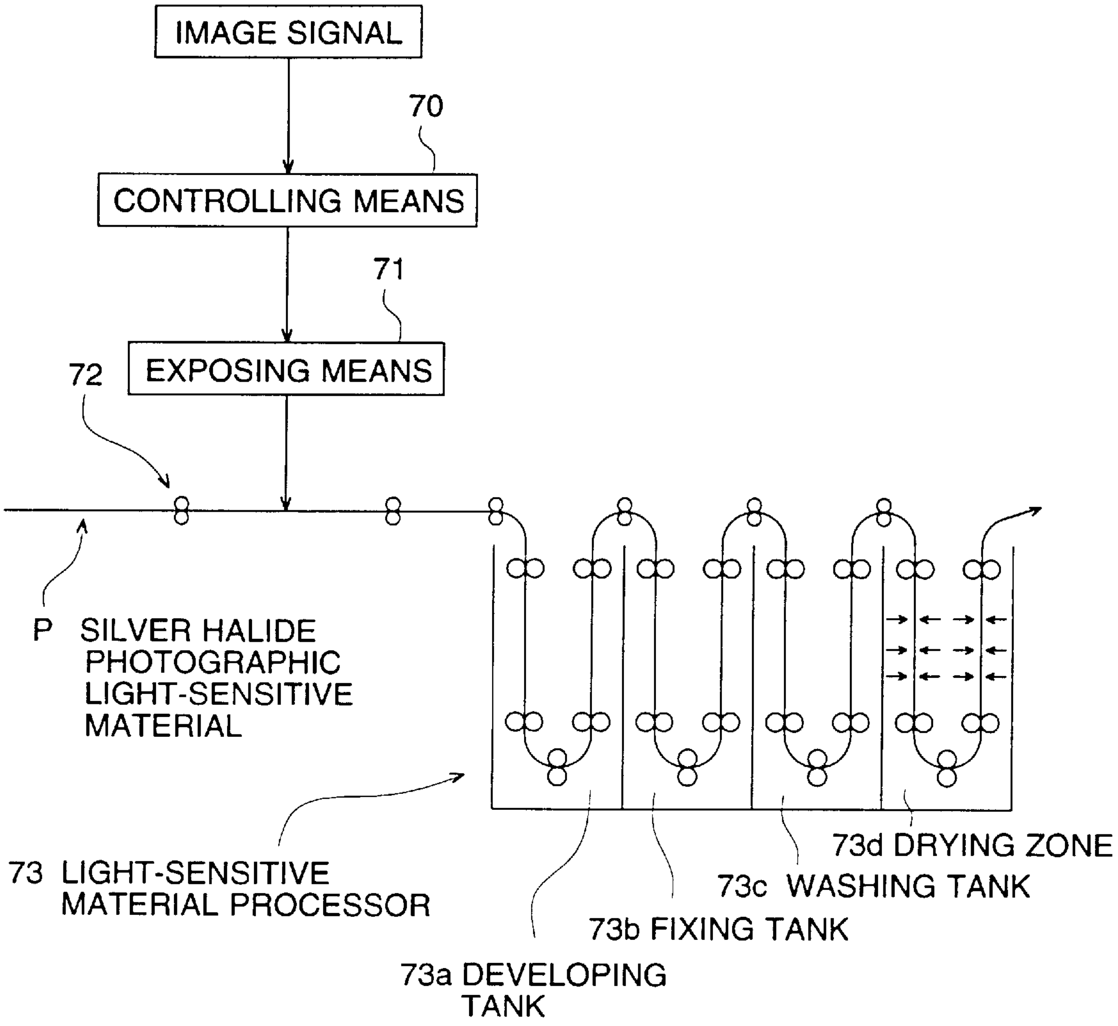
FIG. 4 is a schematic structural drawing of a laser imager.

A laser imager 6 has a light-sensitive material processor 37. FIG. 4 shows schematic constitution of the laser imager.

The laser imager 6 is constituted by a controlling means 70 for converting an image signal to intensity of a laser light beam, an exposing means 71 for scanning a silver halide photographic light-sensitive material P by the light beam, a roller transportation automatic processor 73 for forming a radiographic image by developing, fixing, washing and drying the silver halide photographic light-sensitive material.

The light-sensitive material processor 73 has a developing tank 73*a*, fixing tank 73*b*, washing tank 73*c* and drying zone 73*d*. The light-sensitive material P is transported by a roller transporting means through the developing tank 73*a*, the fixing tank 73*b* and the washing tank 73*c*, so as to be respectively processed by each processing solutions and to be dried in the drying zone 73*d*, and taken out. Thus a radiographic image is obtained.

A suitable image quality relating to the diagnosis ability having a good balance between the sharpness and graininess for a radiographic image can be obtained when the silver halide photographic material is subjected to the above-mentioned procedure and a photographic characteristic curve of the light-sensitive material thus processed has a gamma value between fog+0.5 to fog+2.5 of from 2.7 to 3.5 and a gamma value between fog+0.05 to fog+0.5 of from 0.8 to 1.3.

Thus the radiograph can be rapidly and stably obtained by a low cost apparatus.

The silver halide photographic light-sensitive material according to the invention is described below. The silver halide photographic light-sensitive material to be used in the invention gives a characteristic curve having a gamma value $\gamma_1$ of a line connecting a density point fog+0.5 to a density point of fog+2.5 of from 2.7 to 3.5 and a gamma value $\gamma_2$ of a line connecting a density point of fog+0.05 to a density point of fog+0.5 of from 0.8 to 1.3, when the silver halide photographic light-sensitive material is wedgewise exposed to light and processed by the roller transporting type automatic processor under the condition the same that for forming the radiographic image.

It is more preferable that the value of $\gamma_1$ is within the range of from 2.8 to 3.3 and the value of $\gamma_2$ is within the range of from 0.9 and to 1.1. The image quality suitable for the radiographic diagnosis can be obtained when the gamma values are within such the ranges, respectively. The image quality is a balance between the sharpness and the graininess of image relating to the diagnosis ability thereof.

A method to give a suitable sensitivity distribution to silver halide emulsion grains is applicable to obtain the characteristic curve according to the invention. Concretely, usable methods include a method by controlling the grain size distribution of the silver halide grain, a method using a mixture of monodisperse emulsions different in the sensitivity from each other, and a method by laminating two or more emulsion layers different in the sensitivity from each other. Moreover, various methods may be applied such as to control the composition of the processing solution, temperature or time of the processing.

A thickness of emulsion layer of the light-sensitive material relating to the invention is preferably within the range of from 0.5 to 2.5 μm, more preferably 0.8 to 2.0 μm. The thickness of the emulsion layer is defined as the thickness of the emulsion layer provided on one side of the support when emulsion layers are provided on both sides of the support, and the thickness is the total thickness of the emulsion layers when plural emulsion layers are provided on one side of the support. The thickness of the layer can be measured by an electron microscopic photograph of the sample after standing for at least 2 hours in an atmosphere of 23° C. and 50% RH.

A silver halide emulsion to be used in the light-sensitive material can be prepared by a known method. The crystal habit of the grain may be cubic, tetradecahedral, octahedral and that such as spherical in which (111) face and (100) face are optionally coexisted. In the crystal structure of the silver halide grain, the silver halide composition may be different at the inner and outer portion of the grain. Foe example, a monodisperse emulsion having a higher iodide content at the inner portion described in Japanese Patent Publication Open for Public Inspection (JP O.P.I.) No. 2-85846.

In the invention, tabular silver halide grains having an average aspect ratio of not less than 2 are preferably usable, the average aspect ratio is more preferably not less than 3 and nor more than 20. The aspect ratio is defined as the ratio of the diameter of the major plane of the tabular grain to the thickness of the grain. The diameter of main plane of silver halide grain is the diameter of a circle having the same area as the projection area of the major plane.

In the invention, the diameter of the major plane of the tabular silver halide grain is preferably within from 0.05 to 2.0 $\mu$m, more preferably from 0.1 to 1.5 $\mu$m, particularly preferably from 0.15 to 1.0 $\mu$m. The tabular silver halide grain generally a tabular-shaped grain having two parallel major planes. Accordingly, the thickness is the distance of the parallel major planes constituting the tabular silver halide grain. The advantage of the tabular grain is that the spectral sensitization efficiency can be raised and the graininess and the sharpness of image can be improved. Such the effects of the tabular grain are disclosed in, for example, British Patent No. 2,112,157, U.S. Pat. Nos. 4,439,520, 4,433,048, 4,414,310 and 4,434,226, and JP O.P.I. Nos. 58-113927, 58-127921, 63-138342, 63-284272 and 63-305343. The emulsion can be prepared according to the methods described in these publications. Moreover, a tabular grain having (100) major plane described in U.S. Pat. Nos. 4,063,951, 4,386,156, 5,275,930 and 5,314,798 is also preferably usable.

The silver halide emulsion more preferably usable in the invention is silver iodobromide having a silver iodide content of less than 3 mole-%, silver iodochlorobromide, silver bromide, silver chlorobromide, and silver chloride, and silver bromide, silver iodobromide and silver chlorobromide each having a silver iodide content of less than 1.0 mole-% are particularly preferable. The foregoing emulsion may be either a surface latent image forming type which forms a latent image on the surface of the grain or an internal image forming type which forms a latent image in the inner portion of the grain.

The silver halide emulsion relating to the invention is preferably a monodisperse emulsion. An emulsion having a variation coefficient of volume average diameter of not more than 20% is preferably used and one having the variation coefficient of not more than 10% is more preferably used. In the invention, in the case of the tabular grain, the volume average diameter is the average of length of a side of a cube having the same volume as the tabular grain. In the case of a grain having another shape, the conversion is performed in the same manner. The above-mentioned cubic grain and the tetradecahedral grain may be used in a mixture with the tabular grain. It is preferable to use a mixture of two or more kinds of emulsion, at least one of them is a monodisperse emulsion having a variation coefficient of the volume average diameter of not more than 10%. Moreover, it is preferable to use a mixture of emulsions in which a tabular emulsion is used as the highest speed emulsion and a cubic emulsion as the lowest speed emulsion.

It is preferable that the silver halide emulsion to be used in the invention contains a complex of a metal selected from Fe, Co, Ru, Rh, Re, Os and Ir. The metal complex may be used singly or in combination of two or more kinds of them. The content is preferably from $1\times10^{-9}$ to $1\times10^{-2}$ moles, more preferably from $1\times10^{-8}$ to $1\times10^{-4}$ moles, per mole of silver. In the invention, a six-coordination complex represented by the following formula is preferred.

$$[ML_6]^m \qquad \text{Formula}$$

In the formula, M is a transition metal selected from the elements of Groups 6 to 10 of the periodic table, L is a bridging ligand, m is 0, −1, −2, −3 or −4. Examples of ligand represented by L include a halide such as a fluoride, chloride, bromide and iodide, a cyanide, a cyanate, a thiocyanate, a selenocyanate, a tellurocyanate, an azide and aquo ligand, a nitrocyl and a thionitrocyl. Among them, aquo, nitrocyl and thionitrocyl are preferable. When the aquo ligand is present, it is preferable that the aquo ligand occupies one or two ligands. L may be the same or different.

Preferable examples of the complex in which M is rhodium (Rh), ruthenium (Ru), Rhenium (Re), osmium (Os) or iridium (Ir), are shown below.

1: $[RhCl_6]^{3-}$
2: $[RhCl_5(H_2O)]^{2-}$
3: $[Rh(NO)_2Cl_4]^-$
4: $[Rh(NO)(H_2O)Cl_4]^-$
5: $[Rh(NS)Cl_5]^{2-}$
6: $[RuCl_6]^{3-}$
7: $[RuBr_6]^{3-}$
8: $[Ru(NO)Cl_5]^{2-}$
9: $[Ru(NO)(H_2O)Cl_4]^-$
10: $[Ru(NS)Cl_5]^{2-}$
11: $[RuBr_4(H_2O)]^{2-}$
12: $[Ru(NO)CN_5]^{2-}$
13: $[ReCl_6]^{3-}$
14: $[Re(NO)Cl_5]^{2-}$
15: $[Re(NO)CN_5]^{2-}$
16: $[Re(NO)ClCN_4]^{2-}$
17: $[Re(NO)Cl_5]^-$
18: $[Re(NS)Cl_4(SeCN)]^{2-}$
19: $[OsCl_6]^{3-}$
20: $[Os(NO)Cl_5]^{2-}$
21: $[Os(NS)Cl_4(TeCN)]^{2-}$
22: $[Os(NS)Cl(SCN)_4]^{2-}$
23: $[IrCl_5]^{2-}$
24: $[Ir(NO)Cl_5]^{2-}$

As chromium, cobalt or iron compounds, hexacyano metal complexes are preferable usable. Examples of them are shown below.

25: $[Cr(NO)Cl_5]^{2-}$
26: $[CrCl_6]^{4-}$
27: $[Fe(CN)_6]^{4-}$
28: $[Fe(CN)_6]^{3-}$
29: $[Co(CN)_6]^{3-}$

The compound supplying the above-mentioned metal ion or complex ion is preferably added at a period of silver halide grain formation so as to be contained in the silver halide grain. The metal ion or the complex ion may be added at any step of the grain formation, namely the steps of nucleus formation, growing, physical ripening and before and after chemical ripening. It is preferable to add at the step of nucleus formation, growing and physical ripening of the grain, and more preferable to add at the steps of nucleus formation and growing the grain. It is most preferable to add at the step of nucleus formation. The addition may be separately performed in several times, and the metal ion or the complex ion may be uniformly contained in th e silver halide grain.

A noodle washing method, a flocculation precipitation method and an ultra-filtration method may be applied to remove a water-soluble salt from the emulsion. Preferable desalting methods include a method using an aromatic hydrocarbon aldehyde resin containing a sulfo group described in Japanese Patent 35-16086 and a method using high molecular flocculation agent G3 or G8 described in JP O.P.I. No. 63 -158644.

It is preferred that the light-sensitive silver halide grain is chemically sensitized. Known sensitizing methods such as a sulfur sensitization, a selenium sensitization, a tellurium sensitization, a noble metal sensitization and a reduction sensitization may be applied. Two or more of the sensitizing methods may be applied in combination. A thiosulfate, a thiourea compound and elemental sulfur may be used for the sulfur sensitization. Compounds preferably usable for the selenium sensitization and the tellurium sensitization are described in JP O.P.I. No. 9-230527. Compounds preferably usable in the noble metal sensitization include chloroauric acid, potassium chloroaurate, potassium aurithiocyanate, gold sulfide, gold selenide and compounds described in U.S. Pat. No. 2,448,060 and British Patent No. 618,061. Compounds usable in the reduction sensitization include ascorbic acid, thiourea dioxide, stannous chloride, a hydrazine derivative, a borane compound, a silane compound and a polyamine compound. The reduction sensitization can be performed by ripening the emulsion while maintaining the pH value of the emulsion at not less than 7.0 or the value of pAg at not more than 8.3.

In the light-sensitive material of the invention, a cyanine dye, a merocyanine dye, a complex cyanine dye, a polynucleus merocyanine dye, a holopolar cyanine dye, a styryl dye, a hemicyanine dye an oxonol dye and a hemioxonol dye may be used as an optical sensitizing dye. For example, sensitizing dyes described in the following publications are usable; JP O.P.I. Nos. 63-159841, 60-140335, 63-231437, 63-259651, 63-304242 and 63-15245, U.S. Pat. Nos. 4,639, 414, 4,740,455, 4,741,966, 4,751,175 and 4,835,096.

Sensitizing dyes effectively usable in the invention are described or cited in, for example, Research Disclosure, Item 7643IV-A, p. 23 (December 1978), and Research Disclosure, Item 1831X, p. 437 (August 1978). A sensitizing dye having a spectral sensitivity suitable for the spectral property of the light source of a laser imager or a scanner may be advantageously selected. For example, compounds described in JP O.P.I. Nos. 9-34078, 9-54409 and 9-80679 are preferably usable.

Suitable cyanine dyes are cyanine dyes having a basic nucleus such as a thiazoline nucleus, an oxazoline nucleus, a pyrroline nucleus, a pyridine nucleus, an oxazole nucleus, a thiazole nucleus, a selenazole nucleus and an imidazole nucleus. Preferable ones of suitable merocyanine dye have an acidic nucleus such as a thiohydantoin nucleus, a rhodanine nucleus, an oxazolinedione nucleus, a thiazolinedione nucleus, a barbituric acid nucleus, a thiazolinone nucleus, malonitrile nucleus and a pyrazolone nucleus additionally with the foregoing basic nuclei. These dyes may be used singly or in combination, the combination of dyes is often used for the purpose of super sensitization. A dye having no sensitizing ability or a substance which substantially does not absorb visible light, showing a super sensitizing effect may be contained in the emulsion. The suitable combination of sensitizing dye and a dye showing the super sensitizing effect and the substance showing the super sensitizing effect are described in Research Disclosure 176, No. 17643 (December 1978) p. 23, Item IV-J, Japanese Patent Nos. 9-25500 and 43-4933, and JP O.P.I. Nos. 59-19032 and 59-192242.

The optical sensitizing dye may be added in a form of solution in an organic solvent such as methanol. The dye may also be added in a form of dispersion of fine solid particles. The adding amount of the spectral sensitizing dye is preferably from 1 to 900 mg, more preferably from 5 to 400 mg, per mole of silver halide even though the amount is varied depending on the kind of dye and the condition of emulsion. The spectral sensitizing dye is preferably added before the completion of chemical ripening process. The dye may be divided several portion and separately added before the completion of chemical ripening. It is more preferable to add the sensitizing dye in the period between the completion of growing process of the grain and before the completion of chemical ripening process. The addition at the time of starting the chemical ripening is particularly preferred.

In the invention, a chemical ripening stopping agent is preferably used to stop the chemical sensitization from the view point of the stability of the emulsion. As the chemical sensitization stopping agent, a halide such as potassium bromide and sodium chloride, an organic compound known as an antifogging agent or a stabilizing agent such as 4-hydroxy-6-methyl-1-3,3a,7-tetraazaindene are usable. These compounds may be singly or in combination.

Various photographic additives may be added to the emulsion to be used in the invention at after or before the physical ripening or the chemical ripening.

A support to be used in the invention is preferably a plastic film such as poly(ethylene terephthalate), polycarbonate, polyimide, nylon, cellulose triacetate and poly(ethylene naphthalate) to obtain a prescribed optical density after processing and to prevent a deformation of image after the processing. Among them, a support of poly(ethylene phthalate (PET), poly(ethylene naphthalate (PEN) and plastic containing a styrene polymer having a syndiotactic structure (SPS) are particularly preferable. The thickness of the support is usually from 50 to 300 $\mu$m, preferably from 70 to 180 $\mu$m. A plastic support treated by heat is also usable. The foregoing plastics are usable in such the thermally treated support. It is preferable for thermal treatment that the support is heated at a temperature higher by not less than 30° C., preferably not less than 35° C., more preferably not less than 40 C, than the glass transition point of the support at a time between the preparation of the support and the emulsion coating on the support, provided that the effect of the invention can not be obtained when the heating is performed at a temperature higher than the melting point of the support.

The usable plastics are described below. Although the polyester composition of PET is wholly composed of poly (ethylene terephthalate), a polyester may be used which contains an acid component such as terephthalic acid, naphthalene-2,6-dicarboxylic acid, isophthalic acid, butylenedicarboxylic acid, sodium 5-sulfoisophthalate or adipic acid, and a glycol component such as ethylene glycol, propylene glycol, butanediol or cyclohexanedimethanol, in an amount of not more than 10 mole-% other than poly (ethylene terephthalate).

A polyester is preferably used as PEN which is composed of poly(ethylene 2,6-naphthalate) and a copolymerized polyester composed of terephthalic acid, 2,6-naphthalenedicarboxylic acid and ethylene glycol, and a mixture of two or more kinds of these polyesters. Another polymerizable component may be copolymerized in the polyester, and another polyester ma be mixed with the polyester.

SPS is a polystyrene which is different from an ordinary polystyrene or atactic polystyrene at the point that SPS has a stereoscopic regularity. The structure having the stereoscopic regularity of SPS is named as a racemo tacticity, and it is preferable that the polymer has many regular portion such as diad-, triad-, pentad- or more tacticity. In the invention, a content of the diad-racemo tacticity is not less than 85%, that of the triad-racemo tacticity is not less than 75%, that of the pentad-racemo tacticity is not less than 50%, and that of the more than pentad-racemo tacticity is not less than 30%. Polymerization of SPS can be performed according to the description in JP O.P.I. No. 3-131843.

The method described in JP O.P.I. No. 9-50094, [0030] to [0070] is preferably applied for casting and subbing the support, although known methods can be applied. It is preferred to make a suitability of the light-sensitive material for a rapid processing that a suitable amount of a hardener is previously added to the light-sensitive material in the course of the coating process to control a swelling rate in the developing, fixing and washing process so as to lower a moisture content of processed light-sensitive material before drying. The swelling ratio in the processing of the light-sensitive material of the invention is preferably from 50 to 150% and the layer thickness after swelled is preferably not more than 20 μm. When the swelling ratio exceeds 150%, the drying is become insufficient, and jamming in an automatic processor, particularly in a rapid processing, tend to be occurred. When the processing is performed in a state that the swelling ratio in water is less than 50%, an unevenness of development and a color remaining tend to be occurred. The swelling ratio is defined as follows; the difference of the thickness of the layer swelled in each of the processing solutions and the thickness of the layer before processing is measured, and the difference is divided by the thickness of the layer before processing and multiplied by 100.

Various additives may be added to the silver halide photographic light-sensitive material according to necessity. Usable additives include those described in RD 17643 (December 1978), RD 18716 (November 1979) and RD 308119. Positions of the descriptions are shown below.

| | RD 17463 | | RD 18716 | | RD 308119 | |
|---|---|---|---|---|---|---|
| Additive | Page | Item | Page | Item | Page | Item |
| Chemical sensitizer | 23 | III | 648 UR | | 996 | III |
| Sensitizing dye | 23 | IV | 648–649 | | 996–998 | IVA |
| Desensitizing dye | 23 | IV | | | 998 | IVB |
| Dye | 25–26 | VIII | 649–650 | | 1003 | VIII |
| Developing accelerator | 29 | XXI | 648 UR | | | |
| Antifoggant stabilizer | 24 | IV | 649 UR | | 1006–1007 | VI |
| Whitening agent | 24 | V | | | 998 | V |
| Hardener | 26 | X | 651 L | | 1004–1005 | X |
| Surfactant | 26–27 | XI | 650 R | | 1005–1006 | XI |
| Antistatic agent | 27 | XII | 650 R | | 1006–1007 | XIII |
| Plasticizer | 27 | XII | 650 R | | 1006 | XII |
| Lubricant | 27 | XII | | | | |
| Matting agent | 28 | XVI | 650 R | | 1008–1009 | XVI |
| Binder | 26 | XXII | | | 1003–1004 | IX |
| Support | 28 | XVII | | | 1009 | XVII |

UR: Upper right column
R: Right column
L: Left column

A processing composition in a form of powder, tablet, pill or granule or those treated by a moisture proof treatment may be used in the processing of the light-sensitive material relating to the invention. In the invention, the powder is a mass of fine crystals, the granule is a granuled matter of the powder, which has a size of from 50 to 5000 μm, and the tablet is a matter shaped in a certain form by compressing the powders or the granules. It is effective to decrease an opening ratio of the developing solution in a processor for reducing a cause of fluctuation of photographic properties. An opening ratio of not more than 80 $cm^2$/liter is preferable. When the opening ratio exceeds 80 $cm^2$/liter, the solid processing composition or the solution having a high concentration just after dissolving tends to be easily oxidized. As a result of that, an insoluble substance or a scum is formed and such problems are caused that the processor and the processed light-sensitive material are stained by the insoluble substance or the scum. Such the problems are solved when the opening ratio is nor more than 80 $cm^2$/liter. The opening ratio is a contacting area of the solution with air per an unit volume of the solution, the unit of the ratio is $cm^2$/liter.

In the invention, the opening ratio is preferably not more than 80 $cm^2$/liter, more preferably from 3 to 50 $cm^2$/liter, further preferably from 10 to 35 $cm^2$/liter. The opening ratio can be decreased by means of the use of a floating lid of plastics for shielding air or a slit type processor described in JP O.P.I. Nos. 63-131138, 63-216050 and 63-235940. The solid processing composition are applicable to a developing solution, a fixing solution and a rinse solution, and a excellent effect for stabilizing photographic properties can be obtained when applied to the developing solution. In the slid processing composition, it is preferable that the whole components is solidified, even though a part of the components may be solidified. The components are separately shaped as solidified compositions and packed as a one package. It is also preferable that each of the composition are cyclically packed in the order of addition to the solution.

In the invention, as a means for supplying the solid processing composition to a processing tank, known method described in Japanese Utility Publication Open for Public Inspection (JU O.P.I.) Nos. 63-137783 and 63-97522 1-85732 is usable when the solid processing composition is a tablet, although any means can be applied as long as it has a function to supply the tablet to the processing tank. When the solid processing composition is a granule or s powder, a method of falling by gravitation described in JU O.P.I. Nos. 62-81964 and 63-84151 and JP O.P.I. No. 1-292375, and a method by means of a screw or an auger described in JU O.P.I. Nos. 63-105159 and 63-195345 may be used, but the method is not limited thereto. In the invention, the solid processing composition is supplied into a processing tank, and preferably supplied at a place where is connected to a portion processing the light-sensitive material and the processing solution is flowed to the processing portion through the supplying place. It is further preferable that a certain amount of the processing solution is circulated to the processing portion through the supplying place so that the dissolved composition is moved to the processing portion. The solid processing composition is preferably supplied into a thermally controlled processing solution. In a developing composition, a hydroxy benzene, an aminophenol and a pyrazolidone described in JP O.P.I. No. 6-138591, pages 19–20, and a reductone described in JP O.P.I. No. 5-165161 are preferably used. Among the usable pyrazolidone compounds, ones having a substituent at 4-position such as Dimezone or Dimezone S is particularly preferred since the solubility is suitable and the degradation during storage is small. As a conservative, a sulfite and an organic reducing agent can be used. Moreover, a chelating agent, and a bisulfite adduct of a hardener may be added. A compound described in JP O>P.I. Nos. 5-289255 and 6-308680 (Formula [4-a] or [4-b]) is preferably added as a silver sludge preventing agent. An addition of a cyclodextrin compound, particularly a compound described in JP O.P.I. No. 1-124853, is preferable. An amine compound may be added to the developing composition, and a compound described in U.S. Pat. No. 4,269,929 is particularly preferable. It is necessary to add a buffering agent into the developing composition. Examples of the buffering agent include sodium carbonate, potassium carbonate, sodium hydrogen carbonate, potassium hydrogen carbonate, trisodium phosphate, tripotassium phosphate, dipotassium phosphate, sodium borate, potassium borate, sodium tetraborate, potassium tetraborate, sodium o-hydroxybenzoate, potassium o-hydroxybenzoate acid, sodium 5-sulfo-2-hydroxybenzoate or sodium 5-sulfosalicylate, and potassium 5-sulfo-2-hydroxybenzoate. The following compound may be added as a developing accelerator; a thioether compound described in Japanese Patent (JP) Nos. 37-16088, 37-5987, 38-7826, 44-12380, and 45-9019 and U.S. Pat. No. 3,813,247, a p-phenylenediamine compound described in JP O.P.I. Nos. 52-49829 and 50-15554, a quaternary ammonium salts described in JP O.P.I. No. 50-137726, JP No. 44-30074, JP O.P.I. Nos. 56-156826 and 52-43429, a p-aminophenol compound described in U.S. Pat. Nos. 2,610,122 and 4,119,462, an amine compound described in U.S. Pat. Nos. 2,494,903, 3,128,182, 4,230,796, 3,253,919, 2,482,546, 2,596,926 and 3,582,346, and JP 41-11431, a polyalkylene oxide described in JP Nos. 37-16088, 42-25201, 41-11431 and 42-23883, and U.S. Pat. Nos. 3,128,183 and 3,532,501. Moreover, a hydrazine compound, a mesoion type compound and an imidazole compound may be added according to necessity. An alkali metal halide such as potassium bromide and an organic fog inhibitor may be used as a fog inhibiting agent.

Examples of the fog inhibiting agent include benzotriazole, 6-nitrobenzimidazole, 5-nitroisoindazole, 5-methylbenzotriazole, 5-nitrobenzotriazole, 5-chlorobenzotriazole, 2-thizolylbenzimidazole, 2-thiazolylmethylbenzimidazole, indazole, hydroxyazaindolizine, adenine and 1-phenyl-5-mercaptoterazole. In the developing composition, methyl cellosolve, methanol, acetone, dimethylformamide, a cyclodextrin compound and a compound described in JP Nos. 47-33378 and 44-9509 may be added according to necessity as an organic solvent for raising the solubility of the developing agent. Moreover, various additives such as a stain preventing agent and a sludge preventing agent may be used.

A starter is preferably added before processing and a solidified starter may also preferably used. An organic acid such as a polycarboxylic acid, an alkaline earth metal halide such as potassium bromide, an organic inhibitor and a developing accelerator are usable in the starter. The pH value of the developing solution controlled by the starter is preferably within the range of from 9 to 12, more preferably from 9.5 to 10.5. The developing temperature is from 20 to 60° C., preferably from 30 to 45° C.

The fixing solution to be used in the invention is described below. The fixing solution is preferably contains a thiosulfate. The thiosulfate is ordinary used as a salt of lithium, potassium, sodium or ammonium, and sodium thiosulfate and ammonium thiosulfate are preferable. A fixing solution having a high fixing speed by the use of ammonium thiosulfate, and the sodium salt is preferable from the viewpoint of storage ability. The concentration of thiosulfate is preferably from 0.1 to 5 moles/liter, more preferably 0.5 to 2 moles/liter and further preferably from 0.7 to 1.8 moles/liter. Other than the above-mentioned, an iodide salt and a thiocyanate are usable as a fixing agent. The fixing solution preferably contains a sulfite. The concentration of sulfite is not more than 0.2 moles/liter in a aqueous solution in which a thiosulfate is coexisted. A solid salt of lithium, potassium, sodium or ammonium is used as the sulfite, and the sulfite is dissolved together with a solid thiosulfate for use. The fixing solution to be used in the invention may contain a water-soluble chromium salt or a water-soluble aluminum salt. Chromium alum is usable as the water-soluble chromium salt and aluminum sulfate, potassium aluminum chloride and aluminum chloride are usable as the water-soluble aluminum salt.

The adding amount of the chromium salt or the aluminum salt is from 0.2 to 3.0 g, preferably from 1.2 to 2.5 g, per liter of the fixing solution. Acetic acid, citric acid, tartaric acid, malic acid, succinic acid, phenylacetic acid and their optical isomers may be contained in the fixing composition. Preferable examples of salt of these acids include salts of lithium, potassium, sodium and ammonium such as potassium citrate, lithium citrate, sodium citrate, ammonium citrate, lithium hydrogen tartarate, potassium hydrogen tartarate, potassium tartarate, sodium hydrogen tartarate, sodium tartarate, ammonium hydrogen tartarate, ammonium potassium tartarate, sodium potassium tartarate, sodium malate, ammonium malate, sodium succinate, and ammonium succinate. Among them, acetic acid, citric acid, isocitric acid, malic acid, phenylacetic acid and their salts are preferred. An adding amount of the compound is preferably from 0.2 to 0.6 moles/liter. Inorganic acids such as sulfuric acid, hydrochloric acid, nitric acid and boric acid and their salts, and organic acids such as formic acid, propionic acid, oxalic acid and malic acid are usable as the acid, and boric acid and a polycarboxylic acid and their salts are preferred. β-alanine and piperidic acid are preferable among the polycarboxylic acids. A preferable adding amount of the acid is from 0.5 to 40 g/liter. Aminocarboxylic acids such as nitrilotriacetic acid and ethylenediaminetetraacetic acid are usable as the chelating agent.

Anionic surfactants such as a sulfate ester compound and a sulfonate compound, nonionic surfactants such as a polyethylene glycol and an esterized compound, and amphoteric surfactants described in JP O.P.I. No. 57-6840 are usable as the surfactant. Examples of the wetting agent include an alkanolamine and an alkylene glycol. Examples of the fixing accelerating agent include an urea derivative described in JP O.P.I. No. 45-35754, and JP 58-122535 and 58-122536, an alcohol having a triple bond in the molecule thereof, and a thioether described in U.S. Pat. No. 4,126,459. A pH value of the fixing composition after dissolved or diluted is usually not lass than 3.8, preferably from 4.2 to 5.5. A fixing temperature is from 20 to 60° C., preferably from 30 to 45° C. A fixing time is from 3 to 90 seconds. preferably 5 to 60 seconds. The total processing time for dry to dry including developing, fixing, washing and drying is from 15 to 210 seconds. preferably from 15 to 90 seconds.

EXAMPLES

<Preparation of light-sensitive material>

Silver halide emulsions E1 and E2 were prepared.

A1

| | |
|---|---|
| Ossein gelatin | 24.4 g |
| Water | 9657 ml |
| S-3 (10% methanol solution) | 6.78 ml |

S-3

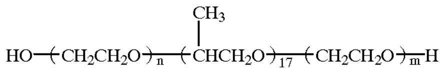

$n + m = 5.7$

| | |
|---|---|
| Potassium bromide | 10.8 g |
| 10% nitric acid | 114 ml |

B1

| | |
|---|---|
| 2.5N aqueous solution of silver nitrate | 2825 ml |

C1

| | |
|---|---|
| Potassium bromide | 841 ml |
| Water to make | 2825 ml |

D1

1.75N aqueous solution of potassium bromide

An amount necessary to controlling silver electrode potential.

To Solution A1, 464.3 ml of Solution B1 and the same amount of Solution C1 were added spending 90 seconds by a double-jet method at 40° C. using a mixing device described in JP Nos. 58-58288 and 58-58289 to form nuclei.

After completion of the addition of Solutions B1 and C1, the temperature of Solution A1 including the nuclei was raised to 60° C. spending 60 minutes, and the pH of the solution was adjusted to 5.0 using a 3% solution of KOH. Then Solutions B1 and C1 were added spending 42 minutes in a flow rate of 55.4 ml/minute. A silver electrode potential of the solution was controlled using Solution D1 so that the potential in the course of temperature rising from 42° C. to 60° C. is maintained at 14 mV and that in the course of the addition of Solution B1 and C1 by the double-jet method is maintained at 25 mV. The silver electrode potential was measured by a silver ion selective electrode using a saturated silver-silver chloride electrode as a comparative electrode. The pH of the mixture was adjust to 6 and the mixture was desalted and washed just after completion of the addition of the solutions. Thus Emulsion E1 was obtained. It is confirmed by an electronic microscope that, in this silver bromide emulsion, 90% of the total projection area of silver halide grains was accounted by hexagonal tabular grains each having the maximum ratio of adjacent sides of from 1.0 to 2.0, and an average thickness of the hexagonal tabular grains was 0.08 μm, and an average diameter, circle corresponding diameter, was 0.45 μm. Accordingly the aspect ratio was 4.5. A variation coefficient of thickness of the grains was 22% and a variation coefficient of distance between the twin crystal face was 33%. A volume average diameter of the silver bromide emulsion was 0.23 μm and a variation coefficient of the volume average diameter was 15%.

The temperature of the emulsion was adjusted to 60° C., and a prescribed amount of spectral sensitizing dye D-1 was added to the emulsion. An aqueous solution of a mixture of adenine, ammonium thiocyanate, chloroauric acid and sodium thiosulfate and a dispersion of triphenylphosphine selenide were added to the emulsion, at 10 minutes after the addition of the spectral sensitizing dye. Then the emulsion was subjected to ripening for 90 minutes in total. A prescribed amount of 4-hydroxy-6-methyl-1,3,3a,7-tetraazaindene was added as a stabilizing agent at the completion of the ripening.

Amounts of the foregoing additives in terms of per mole of silver halide were as follows.

| | |
|---|---|
| Spectral sensitizing dye D-1 | 30 mg |
| Adenine | 15 mg |
| Ammonium thiocyanate | 60 mg |
| Chloroauric acid | 5.5 mg |
| Sodium thiosulfate | 6.0 mg |
| Triphenylphosphine selenide | 0.4 mg |
| 4-hydroxy-6-methyl-1,3,3a,7-tetraazaindene | 500 mg |

A monodisperse cubic emulsion having an average diameter of 0.1 μm was prepared by adding an aqueous potassium bromide and an aqueous silver nitrate solution to a 0.5% gelatin aqueous solution by a double-jet method at 60° C. while pH and pAg were controlled at 0.8 and 20, respectively. An aqueous solution of potassium bromide containing $1 \times 10^{-6}$ moles per mole of silver of potassium hexachloroiridate and an aqueous solution of silver nitrate were added to the above-obtained emulsion by a double-jet method while the pAg of the emulsion was being controlled to adjust to 7.3. In the emulsion the above obtained silver bromide grains were used as the nuclei. Thus a monodisperse cubic grain emulsion having a volume average grain diameter of 0.22 μm was obtained. It is confirmed by measurement on 1,000 grains that the grains has 98% of (100) face and a variation coefficient of grain diameter was 10%. A condensed product of sodium naphthalenesulfonate and formaldehyde and magnesium sulfate were added to the emulsion kept at 40° C. and stirred, and stood. After standing, excess salts were removed by decantation. Then the emulsion is redispersed in a suitable amount of an aqueous gelatin solution to prepare Emulsion E2.

The temperature of the emulsion was adjusted to 60° C., and a prescribed amount of spectral sensitizing dye D-1 was added to the emulsion. An aqueous solution of a mixture of adenine, ammonium thiocyanate, chloroauric acid and sodium thiosulfate and a dispersion of triphenylphosphine selenide were added to the emulsion, 10 minutes after the addition of the spectral sensitizing dye. Then the emulsion was subjected to ripening for 70 minutes in total. A prescribed amount of 4-hydroxy-6-methyl-1,3,3a,7-tetraazaindene was added as a stabilizing agent at the completion of the ripening.

Amounts of the foregoing additives in terms of per mole of silver halide were as follows.

| | |
|---|---|
| Spectral sensitizing dye D-1 | 32 mg |
| Adenine | 10 mg |
| Ammonium thiocyanate | 50 mg |
| Chloroauric acid | 4.0 mg |
| Sodium thiosulfate | 5.0 mg |
| Triphenylphosphine selenide | 0.3 mg |
| 4-hydroxy-6-methyl-1,3,3a,7-tetraazaindene | 500 mg |

The following samples were prepared using each of Emulsions E1 and E2, and Emulsion E3. Emulsion E3 was prepared by mixing Emulsion E1 and E2 in a ratio of 10:90.

Preparation of Emulsion Layer Coating Liquid

The following additives were added to the above-obtained Emulsions E1, E2 and E3, respectively.

| | |
|---|---|
| 2,6-bis(hydroxyamino)-4-diethylamino-1,3,5-triazine | 5 mg/m$^2$ |
| 1,1-dimethylol-1-brom-1nitromethane | 70 mg/m$^2$ |
| t-Butylcatechol | 130 mg/m$^2$ |
| Polyvinyl pyrrolidone (molecular weight: 10,000) | 35 mg/m$^2$ |
| Styrene/maleic anhydride copolymer | 80 mg/m$^2$ |
| Sodium polystyrenesulfonate | 80 mg/m$^2$ |
| Trimethylolpropane | 350 mg/m$^2$ |
| Nitrophenyl-triphenyl-phosphonium chloride | 20 mg/m$^2$ |
| Ammonium 1,3-dihydroxybenzene-4-sulfonate | 500 mg/m$^2$ |
| Sodium 2-mercaptobenzimidazole-5-sulfonate | 5 mg/m$^2$ |
| Compound (A) | 0.5 mg/m$^2$ |
| n-$C_4H_8OCH_2CH(OH)CH_2N(CH_2COOH)_2$ | 350 mg/m$^2$ |
| Compound (B) | 5 mg/m$^2$ |

The amount of gelatin was decided so that the coating amount become 1.7 g/m$^2$.

Protective Layer Coating Liquid

| | |
|---|---|
| Gelatin | 0.7 g/m$^2$ |
| Poly(methyl methacrylate) matting agent (area average diameter: 7.0 μm) | 50 mg/m$^2$ |
| $(CH_2CHSO_2CH_2)_2O$ | 6 mg/m$^2$ |
| Sodium 4-dichloro-6-hydroxy-1,3,5-triazine | 10 mg/m$^2$ |
| Polyacrylamide (average molecular weight: 10,000) | 0.2 mg/m$^2$ |
| Sodium dihexylsulfosuccinate | 7 mg/m$^2$ |
| $C_8F_{17}SO_3K$ | 0.4 mg/m$^2$ |
| $C_8F_{17}SO_2N(C_3H_7)(CH_2CH_2O)_8H$ | 2 mg/m$^2$ |
| $C_9H_{19}CH_2O(CH_2CH_2O)_{12}H$ | 1 mg/m$^2$ |
| Backing layer coating liquid | |
| Ossein gelatin | 2.0 g/m$^2$ |
| Anti-halation dye, Compound (C) | 250 mg/m$^2$ |
| Backing protective layer liquid | |
| Ossein gelatin | 0.9 g/m$^2$ |
| Poly(methyl methacrylate) (average diameter: 6 μm) | 50 mg/m$^2$ |
| Sodium dihexylsulfosuccinate | 10 mg/m$^2$ |
| $C_8F_{17}SO_3K$ | 0.6 mg/m$^2$ |
| $C_8F_{17}SO_2N(C_3H_7)(CH_2CH_2O)_8H$ | 2.5 mg/m$^2$ |
| $C_8H_{17}CH_2O(CH_2CH_2O)_{12}H$ | 2 mg/m$^2$ |

-continued

| | |
|---|---|
| $(CH_2CHSO_2CH_2)_2O$ | 10 mg/m$^2$ |
| Sodium 4-dichloro-6-hydroxy-1,3,5-triazine | 15 mg/m$^2$ |

Preparation of Emulsion E4

Emulsion E4 was prepared in the same manner as in Emulsion E1 except that the amount of S-3 was changed to 2 ml and the silver electrode potential at the step of temperature rising and that of the secondary double-jet mixing of Solutions B1 and C1 were controlled at 10 mV and 20 mV, respectively. In thus obtained emulsion, the projection area of hexagonal tabular silver halide grains each having a maximum adjacent side ratio of from 1.0 to 2.0 account for not less than 70% the total projection area of whole grains contained in the emulsion. The hexagonal tabular grains have an average thickness of 0.07 μm, an average circle corresponding diameter of 0.48 μm, an average aspect ratio of 6.9, a variation coefficient of the thickness of 26%, a variation coefficient of the distance between twin surfaces of 34%, a volume average diameter of 0.23 μm and a variation coefficient of volume average diameter of 25%. The emulsion was chemically and optically sensitized in the same manner as in Emulsion E1. Thus Emulsion E4 was prepared.

Preparation of Emulsion E5

Emulsion E5 was prepared in the same manner as in Emulsion E2 except that the amount of potassium hexachloroiridate is changed to $1\times10^{-7}$ moles per mole of silver. The silver halide grains of this emulsion have volume average diameter of 0.22 μm and a variation coefficient of diameter of 10%. Eighty five percent of the grains has (100) surface.

Preparation of coated sample

The backing layer coating solution and the backing protective layer coating solution were simultaneously coated on a side of a subbed poly(ethylene terephthalate) support having a thickness of 175 μm, and the emulsion coating liquid and the emulsion protective layer coating liquid were simultaneously coated on another side of the support and dried. A coating amount of the emulsion layer is 1.5 g/m$^2$ in terms of silver, and an amount of gelatin was 1.7 g/m$^2$. and an amount of gelatin of the emulsion protective layer was 0.7 g. A thickness of the emulsion layer was 1.9 μm. An amount of the gelatin of the backing layer was 2.0 g/m$^2$ and that of the backing protective layer was 0.9 g/m$^2$. Thus Sample 1 through 5 were prepared in which Emulsions E1 through E5 were used as shown in the following Table.

Thus obtained sample was stepwise exposed to light of 820 nm by a laser scanner. The exposure time was $1\times10^{-7}$ seconds per pixel and the difference of exposure amount between the steps ΔlogE was 0.15. The exposure was performed at a temperature of 25° C. in the exposing apparatus. The processing is carried out spending 60 seconds by an automatic processor TCX-201 manufactured by Konica Corporation using a developer and fixer TC-DF1 manufactured by Konica Corporation. The processed sample was subjected to densitometry to measure the visual image density of the image and the photographic characteristic curve of the sample was prepared. A gamma value, $\gamma_1$, of the straight connecting between density points of fog+0.5 and fog+2.5 and a gamma value, $\gamma_2$, of the straight line connecting between density points of fog+0.05 and fog+0.5, were read on the characteristic curve.

The sensitivity of the sample using only Emulsion E2 was 80 when the sensitivity of the sample using Emulsion E1 only was set at 100. The sensitivity of Sample 4 and 5 were each 97 and 70, respectively. The sensitivity was defined by a reciprocity of the amount of exposure necessary to form a density of fog+1.0. The values of $\gamma_1$ and $\gamma_2$ of Samples 1 through 5 were as follows.

The sharpness and graininess of the processed samples were visually evaluated and classified in the following five ranks.

5: Excellent

4: Good

3: Normal

2: Inferior a little

1: Obviously inferior

| Sample No | Emulsion | $\gamma_1$ | $\gamma_2$ | Sharpness | Graininess |
|---|---|---|---|---|---|
| 1 | E1 | 2.90 | 0.86 | 4 | 5 |
| 2 | E2 | 3.40 | 1.20 | 5 | 3 |
| 3 | E3 | 3.05 | 0.95 | 5 | 5 |
| 4 | E4 | 2.75 | 0.65 | 2 | 5 |
| 5 | E5 | 2.50 | 1.10 | 1 | 4 |

Samples 1, 2 and 3 were each exposed by the laser scanner according to a radiographic image (an image of leg bones) captured by the foregoing flat panel detector, and subjected to the 60 seconds processed by the automatic processor TCX-201 using developer and fixer TC-DF1, each manufacture by Konica Corporation. As a result, radiographic images excellent in the sharpness and the graininess were obtained, and the effects were particularly notable in Sample 3

Sensitizing dye D-1, Compounds A, B and C are shown

Sensitizing Dye D-1

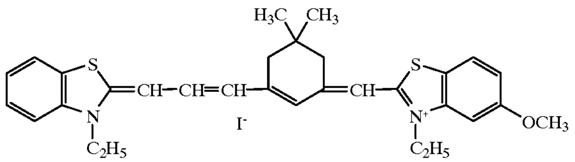

Compound A

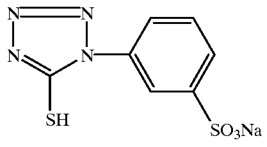

Compound B

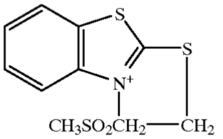

Compound C

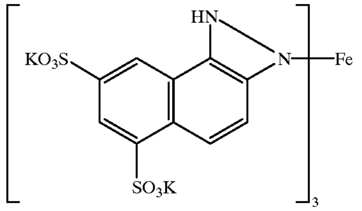

What is claimed is:

1. A method for forming radiographic image comprising the steps of capturing a radiographic image by a flat-panel detector, reading out the radiographic image from the flat-panel detector as image signal, modulating intensity of a laser light beam by the image signals, exposing a silver halide photographic light-sensitive material having a silver halide emulsion layer to the modulated laser light beam by scanning, and processing the silver halide photographic light-sensitive material by a roller transportation automatic processor, wherein a photographic characteristic curve of said silver halide photographic light-sensitive material processed by said processor has a gamma value, $\gamma_1$, of a straight line connecting a density point of fog+0.5 and a density point of fog+2.5 of from 2.7 to 3.5 and a gamma value, $\gamma_2$, of a straight line connecting a density point of fog+0.05 and a density point of fog+0.5 of from 0.8 to 1.3.

2. The method of claim 1, wherein said $\gamma_1$ is within the range of from 2.8 to 3.3 and said $\gamma_2$ is within the range of from 0.9 to 1.1.

3. The method of claim 1 wherein a thickness of said silver halide emulsion layer is within the range of from 0.5 $\mu$m to 2.5 $\mu$m.

4. The method of claim 3, wherein the thickness of said silver halide emulsion layer is within the range of from 0.8 $\mu$m to 2.0 $\mu$m.

5. The method of claim 1, wherein said silver halide emulsion layer contains tabular silver halide grains having an average aspect ratio of not less than 2.

6. The method of claim 5, wherein said average aspect ratio of the tabular silver halide grains is within the range of from 3 to 20.

7. The method of claim 5, wherein a diameter of major plane of the tabular silver halide grains contained in said silver halide emulsion layer is within the range of from 0.05 $\mu$m to 2.0 $\mu$m.

8. The method of claim 1, wherein said silver halide emulsion layer comprises a silver halide grains having a variation coefficient of the volume-average grain diameter distribution of the silver halide grains of not more than 20%.

9. The method of claim 1, wherein said silver halide emulsion layer comprises two or more kinds of silver halide emulsion and at least one of them has a variation coefficient of the volume-average grain diameter distribution of the silver halide grains of not more than 10%.

* * * * *